United States Patent
Procopio et al.

(10) Patent No.: US 10,897,215 B2
(45) Date of Patent: Jan. 19, 2021

(54) PIEZOELECTRIC TRANSDUCER FOR AN ENERGY-HARVESTING SYSTEM

(71) Applicant: STMicroelectronics S.r.l., Agrate Brianza (IT)

(72) Inventors: Francesco Procopio, Sedriano (IT); Carlo Valzasina, Gessate (IT); Alberto Corigliano, Milan (IT); Raffaele Ardito, Milan (IT); Giacomo Gafforelli, Lentate sul Seveso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 504 days.

(21) Appl. No.: 15/913,590

(22) Filed: Mar. 6, 2018

(65) Prior Publication Data

US 2018/0198383 A1    Jul. 12, 2018

Related U.S. Application Data

(62) Division of application No. 14/446,237, filed on Jul. 29, 2014, now Pat. No. 9,941,821.

(30) Foreign Application Priority Data

Jul. 31, 2013   (IT) .............................. TO2013A0652

(51) Int. Cl.
    *H02N 2/18*   (2006.01)
(52) U.S. Cl.
    CPC ............ *H02N 2/186* (2013.01); *H02N 2/181* (2013.01); *H02N 2/188* (2013.01)
(58) Field of Classification Search
    CPC combination set(s) only.
    See application file for complete search history.

(56) References Cited

U.S. PATENT DOCUMENTS

| 2007/0228889 | A1* | 10/2007 | Terje | H02N 2/186 |
| | | | | 310/339 |
| 2008/0079333 | A1* | 4/2008 | Ulm | H02N 2/186 |
| | | | | 310/339 |

(Continued)

FOREIGN PATENT DOCUMENTS

| CN | 102723894 A | 10/2012 |
| KR | 10-1286714 B1 | 7/2013 |

OTHER PUBLICATIONS

Kulah et al., "An Electromagnetic Micro Power Generator for Low-Frequency Environmental Vibrations," 17th IEEE International Conference on Micro Electro Mechanical Systems (MEMS), pp. 237-240, 2004.

(Continued)

*Primary Examiner* — Bryan P Gordon
(74) *Attorney, Agent, or Firm* — Seed IP Law Group LLP

(57) ABSTRACT

A piezoelectric transducer for energy-harvesting systems includes a substrate, a piezoelectric cantilever element, a first magnetic element, and a second magnetic element, mobile with respect to the first magnetic element. The first magnetic element is coupled to the piezoelectric cantilever element. The first magnetic element and the second magnetic element are set in such a way that, in response to relative movements between the first magnetic element and the second magnetic element through an interval of relative positions, the first magnetic element and the second magnetic element approach one another without coming into direct contact, and the interaction between the first magnetic element and the second magnetic element determines application of a force pulse on the piezoelectric cantilever element.

17 Claims, 8 Drawing Sheets

(56) References Cited

U.S. PATENT DOCUMENTS

| | | |
|---|---|---|
| 2008/0136562 A1 | 6/2008 | Kulah et al. |
| 2009/0261689 A1 | 10/2009 | Fang |
| 2010/0181871 A1 | 7/2010 | Daniel et al. |
| 2011/0048133 A1* | 3/2011 | Lin ............... H01L 41/1136 73/514.34 |
| 2011/0210554 A1 | 9/2011 | Boysel |
| 2011/0215590 A1 | 9/2011 | Arnold et al. |
| 2013/0154439 A1* | 6/2013 | Lee .................. H02N 2/188 310/314 |
| 2016/0233413 A1* | 8/2016 | Zawada ............ H01L 41/1136 |
| 2016/0373031 A1* | 12/2016 | Procopio ............ H02N 2/186 |

OTHER PUBLICATIONS

Külah et al., "Energy Scavenging From Low-Frequency Vibrations by Using Frequency Up-Conversion for Wireless Sensor Applications," *IEEE Sensors Journal* 8(3):261-268, Mar. 2008.

Minami et al., "Development of Enhanced Piezoelectric Energy Harvester Induced by Human Motion," $34^{th}$ Annual International Conference of the IEEE EMBS, San Diego, California USA, Aug. 28-Sep. 1, 2012, pp. 1627-1630.

Tang et al.,"Non-Contact Frequency-Up-Conversion Energy Harvester for Durable & Broad-Band Automotive TPMS Application," *Micro Electro Mechanical Systems (MEMS), IEEE 25th International Conference*, Paris, France, Jan. 29-Feb. 2, 2012, pp. 1273-1276.

\* cited by examiner

Cantilever
PIEZOELECTRIC TRANSDUCER FOR AN ENERGY-HARVESTING SYSTEM

BACKGROUND

Technical Field

The present disclosure relates to a piezoelectric transducer for an energy-harvesting system and to a method for harvesting energy through a piezoelectric transducer.

Description of the Related Art

The disclosure is particularly suited to the production of piezoelectric microtransducers that may be used in miniaturized energy-harvesting systems capable of supplying, among others, electronic components and/or devices, such as low-consumption sensors and actuators, frequently used in portable electronic devices, such as cellphones, tablet computers, portable computers (laptops), video cameras, photographic cameras, consoles for videogames, and so forth.

As is known, systems for collecting energy from environmental-energy sources (also referred to as energy harvesting or energy scavenging systems) have aroused and continue to arouse considerable interest in a wide range of fields of technology. Typically, energy-harvesting systems are designed to harvest (or scavenge), store, and transfer energy generated by mechanical sources to a generic load of an electrical type. In this way, the electrical load does not use batteries or other supply systems that are frequently cumbersome, have low resistance to mechanical stresses and entail maintenance costs for replacement operations. Furthermore, systems for harvesting environmental energy are of considerable interest for devices that are in any case provided with battery supply systems, which, however, have a rather limited autonomy. This is the case, for example, of many portable electronic devices that are increasingly becoming widely used, such as cellphones, tablets, portable computers (laptops), video cameras, photographic cameras, consoles for videogames, etc. Systems for harvesting environmental energy may be used for supplying components or devices in order to reduce the energy absorbed from the battery and, in practice, increase the autonomy.

Environmental energy may be harvested from several available sources and converted into electrical energy by appropriate transducers. For instance, available energy sources may be mechanical or acoustic vibrations or, more in general, forces or pressures, chemical-energy sources, electromagnetic fields, environmental light, thermal-energy sources.

For harvesting and conversion piezoelectric transducers may, among others, be used.

Piezoelectric transducers are in general based upon a microstructure comprising a supporting body, connected to which are piezoelectric cantilever elements, having at least one portion made of piezoelectric material. The free ends of the piezoelectric cantilever elements, to which additional masses can be connected, oscillate elastically in response to movements of the supporting body or to vibrations transmitted thereto. As a result of the movements of bending and extension during the oscillations, the piezoelectric material produces a charge that can be harvested and stored in a storage element.

In miniaturized transducers, however, the use of just the piezoelectric cantilever elements and the additional masses does not enable adequate levels of efficiency to be achieved. In practice, the conversion of kinetic energy is not satisfactory because the natural frequency of the system formed by the piezoelectric cantilever element and by the additional mass is too different from the typical environmental frequencies that can be transduced.

To improve the efficiency of piezoelectric transducers, it has been proposed to use a movable mass separate from the piezoelectric cantilever elements and magnets that enable temporary coupling of the movable mass and piezoelectric cantilever elements. The magnets are arranged in part on the movable mass and in part on the piezoelectric cantilever elements and are oriented so as to exert attractive forces. The movable mass is constrained to the supporting body so as to be able to come into contact with the piezoelectric cantilever elements and enable coupling of the magnets. The piezoelectric cantilever elements are drawn along in motion by the movable mass and undergo deformation until the elastic return force exceeds the magnetic force. At this point, the magnets separate, and the action of the magnetic force on the piezoelectric cantilever elements ceases almost instantaneously as the movable mass moves away, allowing the elastic force alone to act. In practice, this is equivalent to applying a force pulse on the piezoelectric cantilever elements, which are hence stimulated over a wide frequency band, which also includes the resonance frequency.

Albeit far better from the efficiency standpoint, the devices described present, however, some limits in terms of reliability. In fact, each oscillation of the movable mass causes impact between the magnets of the movable mass itself and the magnets of the piezoelectric cantilever elements. Even though the frequency of oscillation of the movable mass is low (generally less than about 10 Hz), in the long run repetition of the impact may cause damage to the microstructure. In particular, microcracks may be formed, which rapidly propagate until they render the transducer unserviceable.

BRIEF SUMMARY

The present disclosure is directed to a piezoelectric transducer for an energy-harvesting system and a method for harvesting energy through a piezoelectric transducer that enables the limitations described to be overcome or at least attenuated.

One embodiment of the present disclosure is a transducer that includes a substrate, a moveable mass elastically coupled to the substrate, a plurality of cantilever piezoelectric elements extending from the substrate towards the moveable mass, a plurality of first magnetic elements at free ends of respective cantilever piezoelectric elements, and a plurality of second magnetic elements on the moveable mass, each second magnetic element being aligned with cantilever piezoelectric elements in a rest condition.

BRIEF DESCRIPTION OF THE SEVERAL VIEWS OF THE DRAWINGS

For a better understanding of the disclosure, some embodiments thereof will now be described, purely by way of non-limiting example and with reference to the attached drawings, wherein.

DETAILED DESCRIPTION

Figure 1:
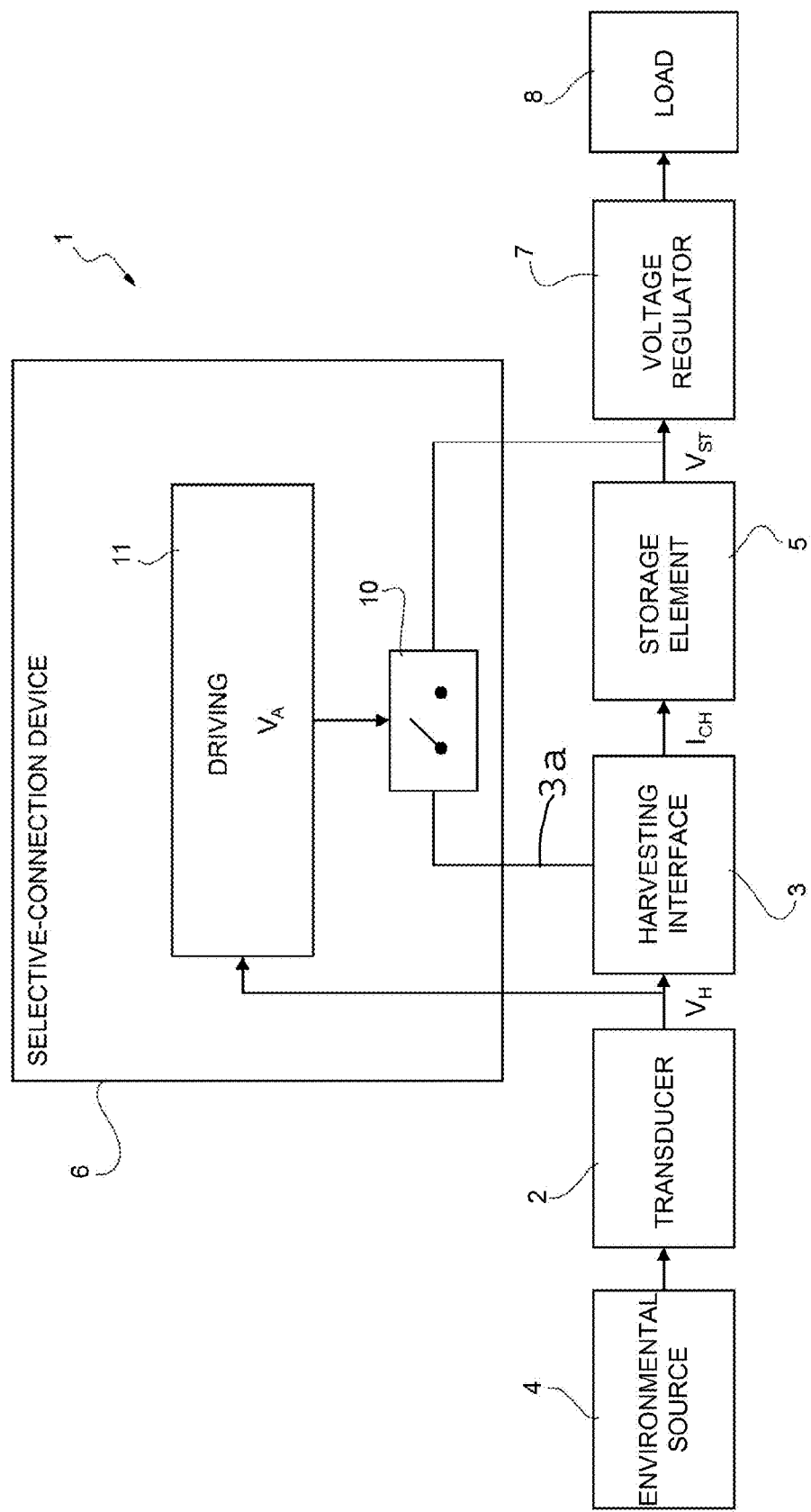
FIG. 1 is a simplified block diagram of an energy-harvesting system.

With reference to FIG. 1, an energy-harvesting system is designated as a whole by the reference number 1. The energy-harvesting system 1 is particularly, but not exclusively, suited to being used for supplying electronic components and/or devices, such as low-consumption sensors and actuators, which ever more frequently used in portable electronic devices, such as cellphones, tablets, portable computers (laptops), video cameras, photographic cameras, consoles for videogames, etc.

Electronic components and devices supplied through the energy-harvesting system 1 are rendered self-sufficient and do not absorb energy from the main supply system (normally a battery), which hence has greater autonomy, to the advantage of users.

Furthermore, in some applications the energy-harvesting system 1 may be used both as main supply source, and as auxiliary supply source for the electronic components and/or devices referred to above. In this case, the energy-harvesting system 1 may be set alongside a conventional supply system, for example a battery supply, and go into operation when the main supply system runs down or presents malfunctioning.

The energy-harvesting system 1 comprises a transducer 2, a harvesting interface 3, a storage element 5, a selective-connection device 6, and a voltage regulator 7. Furthermore, an output of the voltage regulator 7 supplies an electrical load 8.

The transducer 2 supplies a harvesting voltage $V_H$ in response to energy provided by an environmental-energy source 4 external to the harvesting system 1. The transducer 2 is a piezoelectric transducer that supplies a harvesting voltage $V_H$ in response to mechanical vibrations transmitted from the outside environment and will be described in greater detail hereinafter.

The harvesting interface 3, when supplied by the storage element 5, receives the harvesting voltage $V_H$ from the transducer 2 and supplies a charge current $I_{CH}$ to the storage element 5. The energy stored in the storage element 5 increases as a result of the charge current $I_{CH}$ and produces a storage voltage $V_{ST}$.

The selective-connection device 6 selectively connects and disconnects a supply input 3a of the harvesting interface 3 and the storage element 5 on the basis of the response of the transducer 2. More precisely, when the harvesting voltage $V_H$ exceeds an activation threshold $V_A$, that represents a state in which the transducer 2 is active and receives environmental energy from outside, the selective-connection device 6 connects the harvesting interface 3 to the storage element 5, so that the harvesting interface 3 receives the storage voltage $V_{ST}$ present on the storage element 5.

The harvesting interface may thus use the harvesting voltage $V_H$ for charging the storage element 5.

Instead, when the transducer 2 does not receive environmental energy and the harvesting voltage $V_H$ is below the activation threshold $V_A$, the selective-connection device 6 disconnects the harvesting interface 3 from the storage element 5, so that the consumption of energy of the harvesting interface 3 ceases.

In one embodiment, in particular, the selective-connection device comprises a switch 10 and a driving stage 11, configured to drive the switch 10 on the basis of the comparison between the harvesting voltage $V_H$ and the activation threshold $V_A$.

The voltage regulator 7 receives the storage voltage $V_{ST}$ and supplies a regulated supply voltage $V_{DD}$ to the electrical load 8.

The selective-supply device 6 substantially makes it possible to reduce to zero the consumption of the harvesting interface 3 in the absence of activity of the transducer 2 and hence prevents dissipation of energy accumulated on the storage element 5, when the harvesting system 1 is not in a condition to receive energy from the environment.

According to one embodiment of the disclosure, illustrated in FIGS. 2-5, the transducer 2 comprises a microstructure including a supporting body 15, a movable mass 16, and an oscillating piezoelectric cantilever element 17. The supporting body 15, the movable mass 16, and part of the piezoelectric cantilever element 17 are made of semiconductor material, for example monocrystalline silicon.

The supporting body 15 may be a monolithic semiconductor body, or else may be obtained from the union of two or more semiconductor dice, possibly with the interposition of bonding layers and/or dielectric layers.

Figure 6:
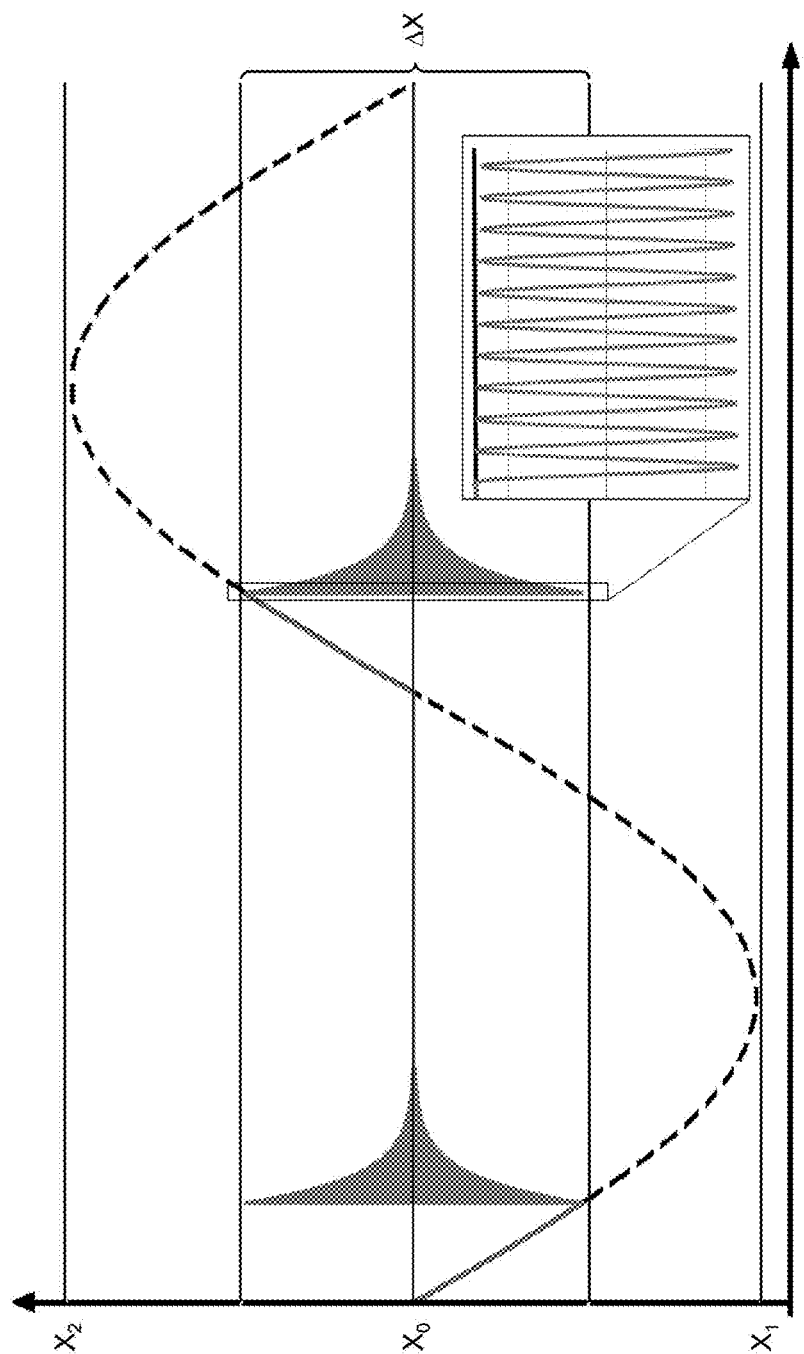
FIG. 6 is a graph that shows quantities regarding the piezoelectric transducer of FIG. 2.

The movable mass 16 is elastically coupled to the supporting body 15 by a system of suspensions 18, here schematically represented by a spring and a damper. The suspensions 18 are configured to enable oscillations of the movable mass 16 along one or more axes of transduction at a first resonance frequency (main resonance frequency of the movable mass 16 constrained by the suspensions 18), for example less than 10 Hz. In the example described, in particular, the movable mass 16 (the position of which during an oscillation is indicated by a dashed line in the graph provided by way of example in FIG. 6) can translate along a transduction axis X parallel to a face 15a of the supporting body 15 between a first end-of-travel position $X_1$ and a second end-of-travel position $X_2$, where there are set stop elements (not shown) in order to prevent undesirable and potentially harmful over-shooting. The movable mass 16 may comprise, in addition to semiconductor structures, also layers or portions made of heavy metals, such as lead or tungsten, in order to improve the energy-harvesting efficiency.

In one embodiment, the piezoelectric cantilever element 17 is defined by a piezoelectric layer 20 formed on a face of a supporting plate 21 made of semiconductor material, integral with the supporting body 15. The piezoelectric layer 20 and the supporting plate 21 are coupled in such a way that any bending of the supporting plate 21 causes corresponding deformations of the piezoelectric layer 20. Furthermore, the piezoelectric layer 20 is connected to a contact pad 22 on the supporting body 15.

Figure 3:
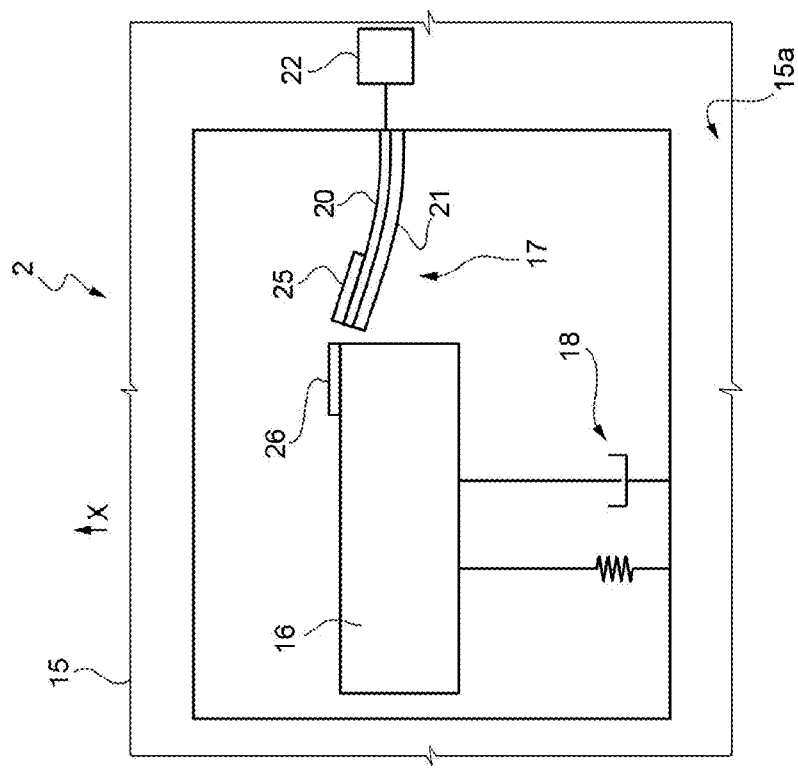
FIG. 3 shows the piezoelectric transducer of FIG. 2 in a second operating configuration.
Figure 2:
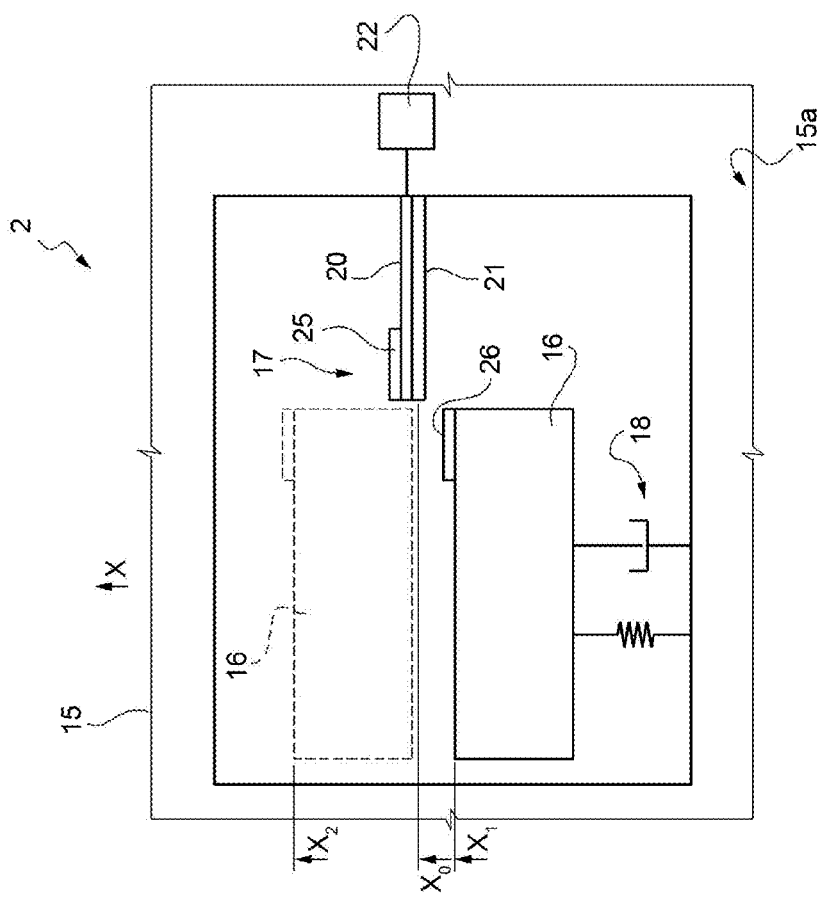
FIG. 2 is a simplified top plan view of a piezoelectric transducer according to one embodiment of the present disclosure and incorporated in the energy-harvesting system of FIG. 1, the piezoelectric transducer being represented in a first operating configuration.
Figure 5:
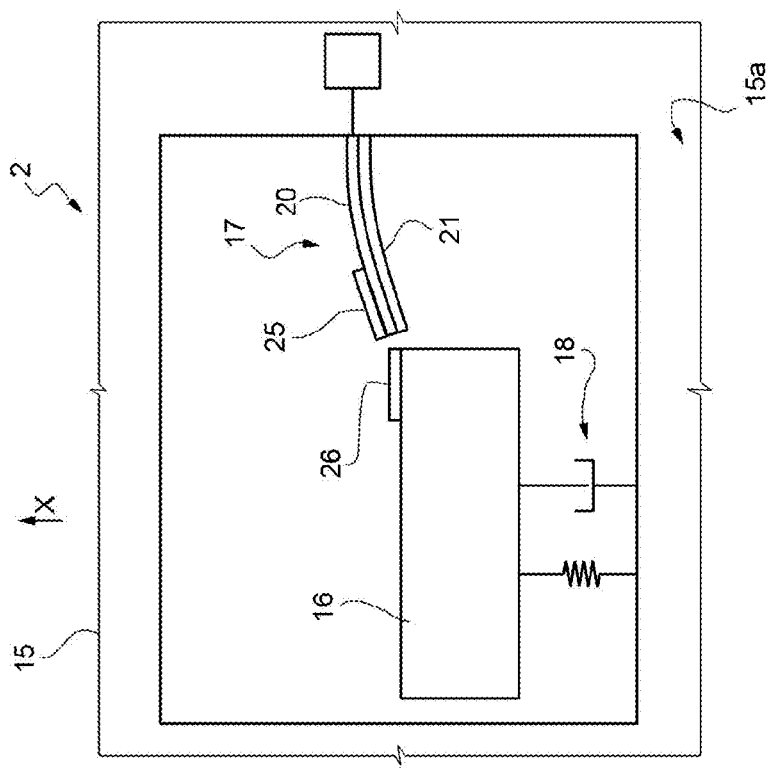
FIG. 5 shows the piezoelectric transducer of FIG. 2 in a fourth operating configuration.
Figure 4:
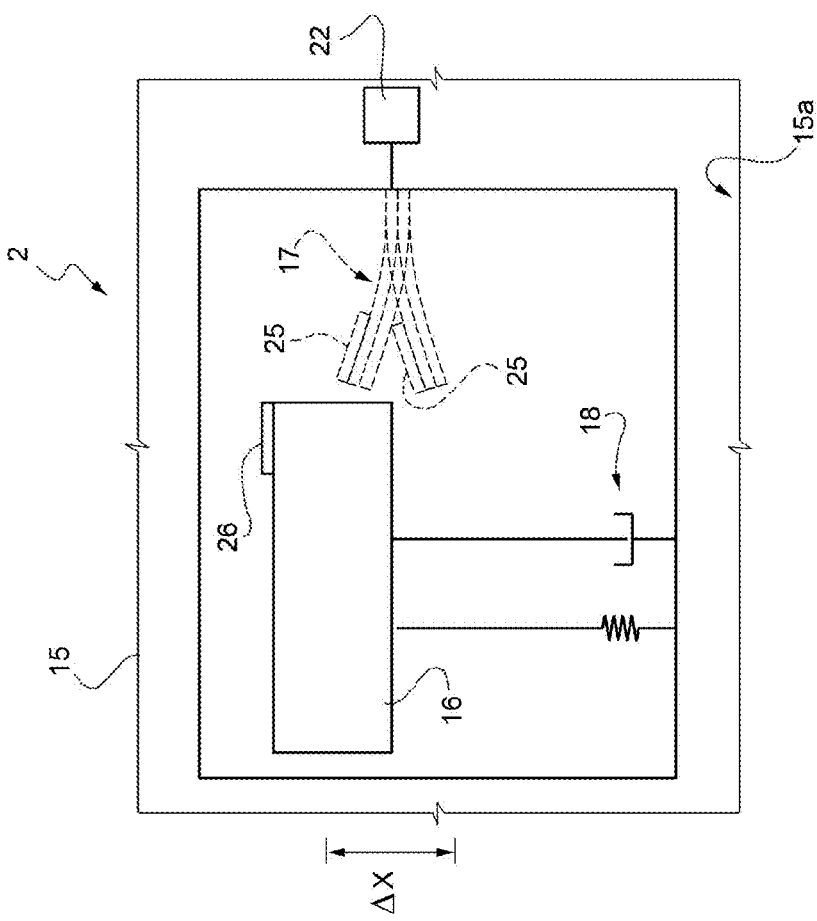
FIG. 4 shows the piezoelectric transducer of FIG. 2 in a third operating configuration.

The piezoelectric cantilever element 17 is anchored to the supporting body 15 and projects from the supporting body 15 in the direction of the movable mass 16, as illustrated in FIGS. 2-4.

Furthermore, the piezoelectric cantilever element 17 extends in a direction transverse, for example substantially perpendicular, to the transduction axis X, which coincides with the direction of motion of the movable mass 16. The length of the piezoelectric cantilever element 17 is such that a free end thereof occupies a position in the proximity of the movable mass 16 at least in an interval of positions of the movable mass 16 along the transduction axis X, without, however, any contact between the movable mass 16 and the piezoelectric cantilever element 17. Preferably, between the movable mass 16 and the piezoelectric cantilever element 17 there is always present at least a minimum distance $L_G$ (FIG. 2).

The ensemble constituted by the piezoelectric cantilever element 17 and the piezoelectric layer 20 is elastically deformable and can oscillate with respect to a rest position with a second resonance frequency (main resonance frequency of the piezoelectric cantilever element 17), higher than the first resonance frequency by at least one order of magnitude and preferably comprised between 1 kHz and 10 kHz. In one embodiment, the second resonance frequency is approximately 1 kHz.

A first magnetic element 25 and a second magnetic element 26 are set, respectively, at the free ends of the piezoelectric cantilever element 17 and on the movable mass 16, on an edge adjacent to the piezoelectric cantilever element 17. The magnetic characteristics of the first magnetic element 25 and of the second magnetic element 26 are selected in such a way that a magnetic force deriving from the interaction of the first magnetic element 25 and of the second magnetic element 26 is sufficient to deform the piezoelectric cantilever element 17 upon passage of the movable mass 16 through an interval of interaction positions ΔX around a rest position $X_0$ of the piezoelectric cantilever element 17. Furthermore, the magnetic characteristics of the first magnetic element 25 and of the second magnetic element 26 are selected so that, outside the interval of interaction positions ΔX, the elastic return force due to deformation of the piezoelectric cantilever element 17 prevails over the magnetic force between the first magnetic element 25 and the second magnetic element 26. Furthermore, outside the interval of interaction positions ΔX the magnetic force rapidly decays as a result of the increasing distance.

When the supporting body 15 varies its condition of motion or is subjected to impact or vibrations, the movable mass 16 oscillates along the transduction axis X. Upon passage through the interval of interaction positions ΔX, albeit in the absence of direct contact, the magnetic interaction between the first magnetic element 25 and the second magnetic element 26 causes deformation of the piezoelectric cantilever element 17. When the movable mass 16 passes beyond the interval of interaction positions ΔX, the elastic return force prevails, and the magnetic force decays until it soon becomes negligible. The piezoelectric cantilever element 17 thus receives a force substantially of an impulsive type, which produces stimuli over a wide frequency band, including the second resonance frequency. The piezoelectric cantilever element 17 starts to oscillate as a result of the pulse received, as indicated with a solid line in FIG. 6, and the corresponding deformation of the piezoelectric layer 20 produces a voltage that can be picked up at the pad 22 and used for charging the storage element 5.

It is to be noted that the magnetic forces between the first magnetic element 25 and the second magnetic element 26 may be indifferently of an attractive or repulsive type, provided that the interaction determines a force pulse on the piezoelectric cantilever element 17 during traversal of the interval of interaction positions ΔX. In one embodiment, the magnetic forces may be attractive when the second magnetic element 26 is located on one side of the first magnetic element 25 and repulsive when the second magnetic element 26 is located on the opposite side.

Energy harvesting is efficient because the oscillations of the movable mass 16 and the piezoelectric cantilever element 17 are decoupled, and hence the piezoelectric cantilever element 17 may vibrate at its natural resonance frequency. Furthermore, the force pulses are transmitted to the piezoelectric cantilever element 17 without direct contact with the movable mass 16 or with the first magnetic element 25 placed thereon. The parts of the microstructure are hence not subjected to impact during operation, to the advantage of reliability.

Figure 8:
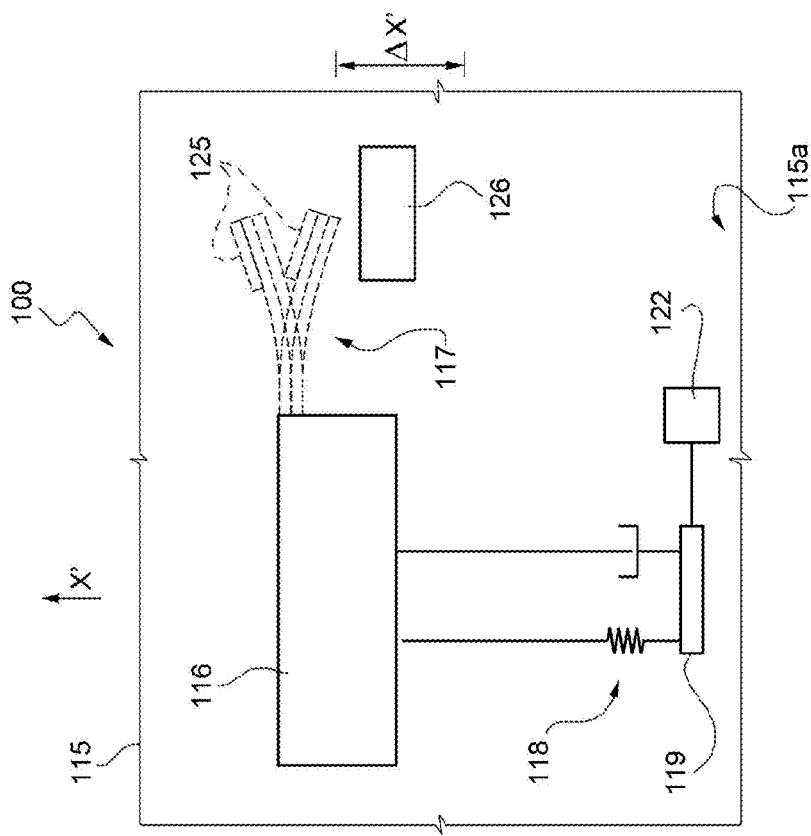
FIG. 8 shows the piezoelectric transducer of FIG. 7 in a second operating configuration.
Figure 7:
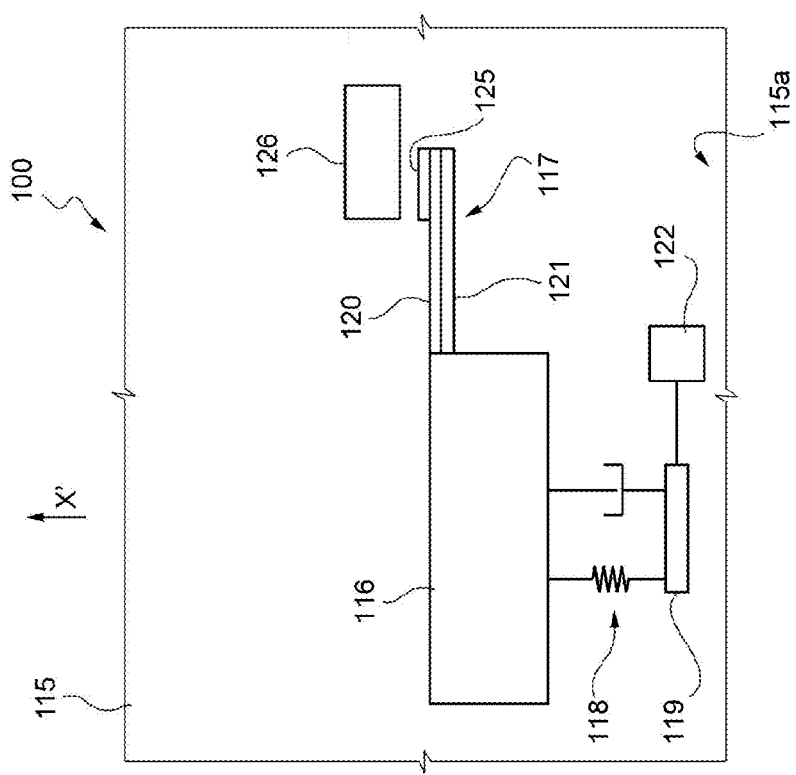
FIG. 7 is a simplified top plan view of a piezoelectric transducer according to a different embodiment of the present disclosure, in a first operating configuration.

According to one embodiment, illustrated in FIGS. 7 and 8, a piezoelectric transducer 100, which may be used in the energy-harvesting system 1 instead of the piezoelectric transducer 2, comprises a supporting body 115, a movable mass 116, and an oscillating piezoelectric cantilever element 117. The supporting body 115, the movable mass 116, and part of the piezoelectric cantilever element 117 are made of semiconductor material, for example monocrystalline silicon.

The movable mass 116 is elastically connected to the supporting body 115 by a system of suspensions 118, fixed to an anchorage 119 and configured to enable oscillations of the movable mass 116 along a transduction axis X' parallel to a face 115a of the supporting body 115 with a first resonance frequency, for example less than 10 Hz.

The piezoelectric cantilever element 117 is defined by a piezoelectric layer 120 formed on a face of a supporting plate 121 of semiconductor material, integral with the movable mass 116. The piezoelectric layer 120 and the supporting plate 121 are shaped so that any bending of the supporting plate 121 causes corresponding deformations of the piezoelectric layer 120. Furthermore, the piezoelectric layer 120 is connected to a contact pad 122 on the supporting body 115 through the suspensions 118 and the anchorage 119, which may themselves be made conductive by appropriate doping or else may be coated with a metal layer.

The piezoelectric cantilever element 117 projects from the movable mass 116 in a direction parallel to a face 115a of the supporting body 115 and substantially perpendicular to the transduction axis X.

The ensemble of the piezoelectric cantilever element 117 and the piezoelectric layer 120 is elastically deformable and can oscillate with respect to a rest position at a second resonance frequency, higher than the first resonance frequency.

A first magnetic element 125 is set at the free end of the piezoelectric cantilever element 117.

A second magnetic element 126 is set on the supporting body 115, along the path of a free end of the piezoelectric cantilever element 117, so that the free end of the piezoelectric cantilever element 117 passes over the first magnetic element 125 or in its immediate vicinity, without in any case direct contact, however.

The magnetic characteristics of the first magnetic element 125 and second magnetic element 126 are selected so that a magnetic force deriving from the interaction of the first magnetic element 125 and of the second magnetic element 126 is sufficient to deform the piezoelectric cantilever element 117 upon passage of the piezoelectric cantilever element 117 in the proximity of the second magnetic element 126. Furthermore, the magnetic characteristics of the first magnetic element 125 and of the second magnetic element 126 are selected so that, outside of an interval of interaction positions ΔX', the elastic return force due to deformation of the piezoelectric cantilever element 117 prevails over the magnetic force between the first magnetic element 125 and the second magnetic element 126. Furthermore, outside of the interval of interaction positions ΔX' the magnetic force decays rapidly as a result of the increasing distance.

Figure 9:
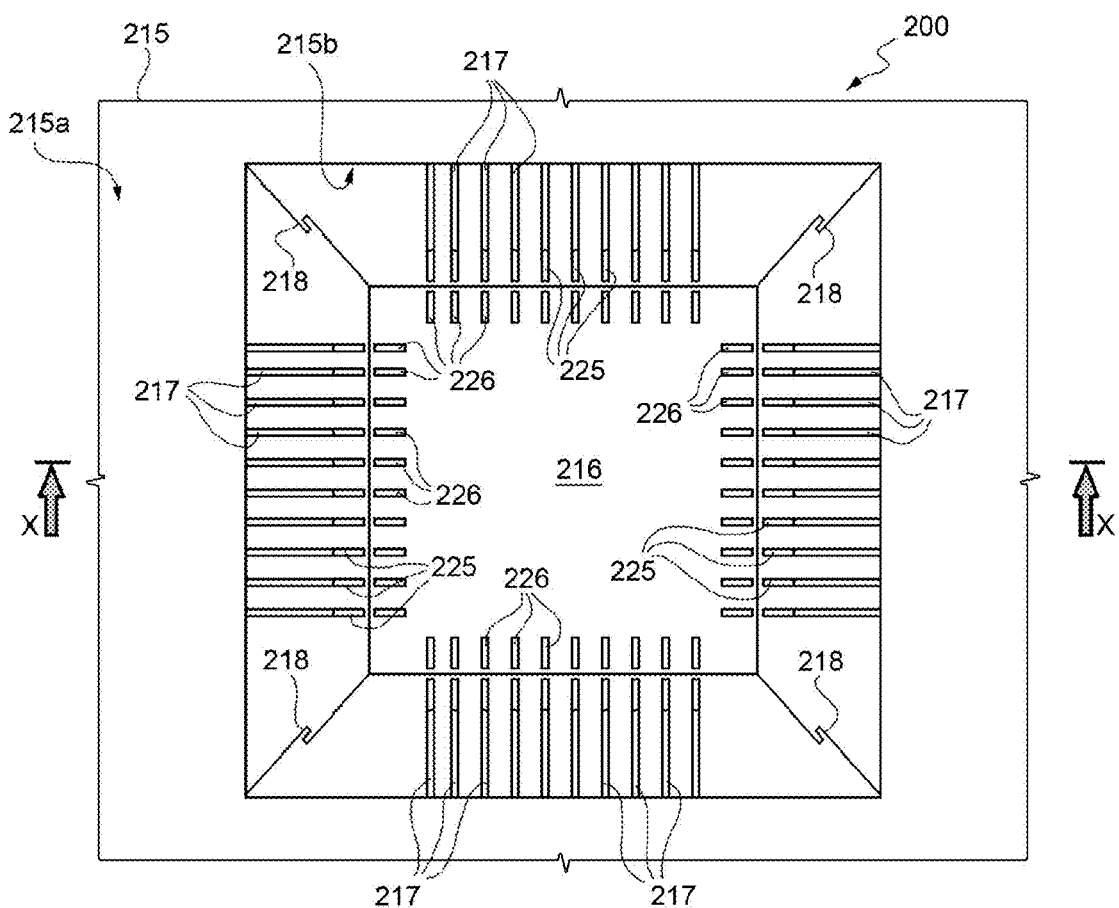
FIG. 9 is a top plan view, with parts removed for clarity, of a piezoelectric transducer according to a different embodiment of the present disclosure.
Figure 10:
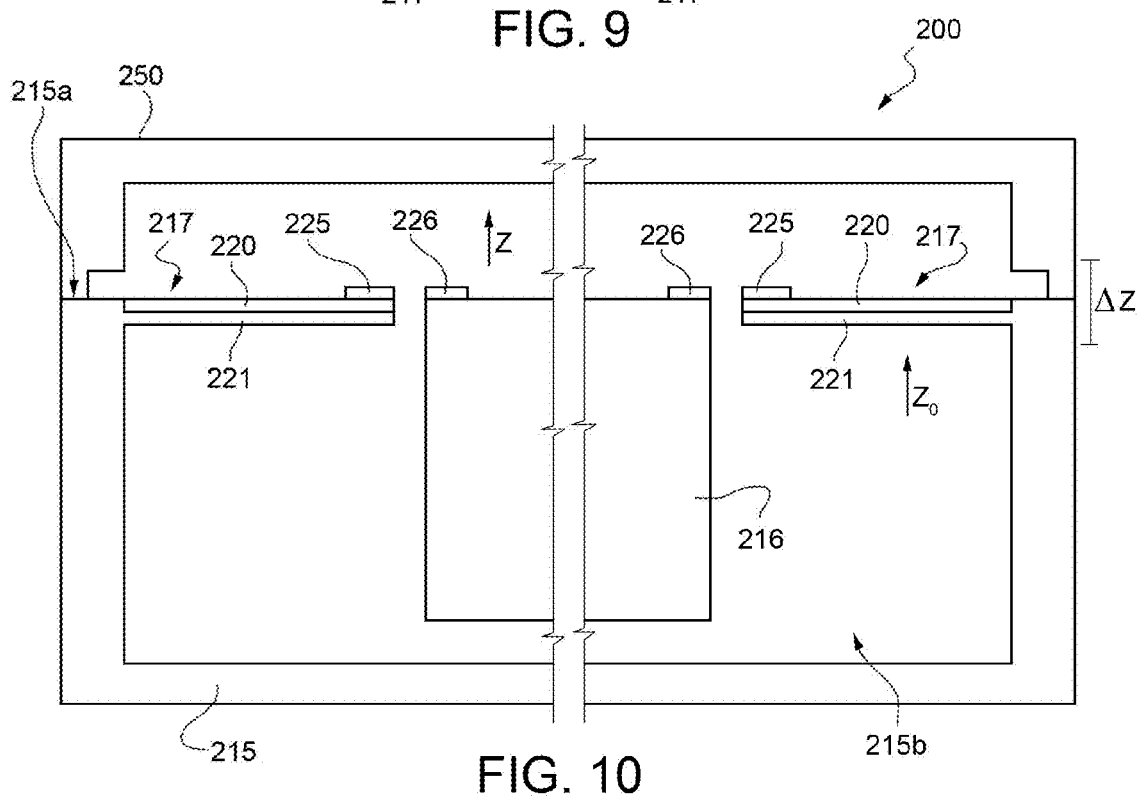
FIG. 10 is an enlarged cross-sectional view through the piezoelectric transducer of FIG. 9, taken along the line X-X of FIG. 9.

FIGS. 9 and 10 illustrate a piezoelectric transducer 200 according to a different embodiment of the present disclosure. The transducer 200 comprises a supporting body 215, a movable mass 216, and a plurality of oscillating piezoelectric cantilever elements 217. The supporting body 215, the movable mass 216, and parts of the piezoelectric cantilever elements 217 are made of semiconductor material, for example monocrystalline silicon. Also illustrated in FIG. 10 is a protective cap 250 arranged so as to cover the movable mass 216.

The supporting body 215 has a recess 215b accessible through a face 215a. The recess 215b houses the movable mass 216, which, in a rest configuration, is flush with the face 215a.

The movable mass 216, which has a substantially rectangular or square shape, is elastically connected to the supporting body 215 by a system of suspensions 218, configured so as to enable oscillations of the movable mass 216 along a transduction axis Z at a first resonance frequency. In the example described, in particular, the transduction axis Z is perpendicular to a face 215a of the supporting body 215. The transducer 200 is consequently of the so-called "out of plane" type. By way of non-limiting example, the movable mass 216 may have a length and width of between 400 and 800 μm, while the thickness may reach 400 μm.

The piezoelectric cantilever elements 217 are defined by piezoelectric layers 220 formed on faces of respective supporting plates 221 of semiconductor material, integral with the supporting body 215 and having faces parallel to the face 215a of the supporting body 215 itself. The piezoelectric layers 220 and the supporting plates 221 are shaped so that any bending of the supporting plates 221 causes corresponding deformations of the respective piezoelectric layers 320. Furthermore, the piezoelectric layers 220 are connected to respective contact pads 222 set on the supporting body 215.

The piezoelectric cantilever elements 217 project from the supporting body 215, in particular from the perimeter of the recess 215b, towards the movable mass 216, in a direction substantially perpendicular to the transduction axis Z and parallel to the face 215a of the supporting body 215. In greater detail, the piezoelectric cantilever elements 217 are comb-fingered in groups, each of which faces a respective side of the movable mass 216. The length of the piezoelectric cantilever elements 217 is such that the respective free ends are in the proximity of the movable mass 216 at least in an interval of positions of the movable mass 216 along the transduction axis Z, without, however, any contact between the movable mass 216 and the piezoelectric cantilever elements 217.

The ensemble of each piezoelectric cantilever element 217 and of the respective piezoelectric layer 220 is elastically deformable and can oscillate with respect to a rest position at a second resonance frequency, higher than the first resonance frequency. The oscillations are substantially in planes perpendicular to the face 215a of the supporting body 215.

First magnetic elements 225 and second magnetic elements 226 are set, respectively, at the free ends of the piezoelectric cantilever elements 217 and on the movable mass 216.

The second magnetic elements 226, in particular, are arranged along the perimeter of the movable mass 216 and are each aligned to a respective piezoelectric cantilever element 217. In one embodiment (not illustrated) a single second magnetic element is present and runs along the entire perimeter of the movable mass 216.

The first magnetic elements 226 are set at the free ends of respective piezoelectric cantilever elements 217 and are hence in the proximity of corresponding second magnetic elements 226 at least when the movable mass 216 is in an interval of interaction positions ΔZ around a rest position $Z_0$ of the piezoelectric cantilever elements 217.

The magnetic characteristics of the first magnetic elements 225 and the second magnetic elements 226 are selected in such a way that a magnetic force deriving from the interaction of the first magnetic elements 225 and of the second magnetic elements 226 is sufficient to deform the piezoelectric cantilever elements 217 upon passage of the movable mass 216 through the interval of interaction positions ΔZ. Furthermore, the magnetic characteristics of the first magnetic elements 225 and of the second magnetic elements 226 are selected so that, outside the interval of interaction positions ΔZ, the elastic return force due to deformation of the piezoelectric cantilever element 217 prevails over the magnetic force between the first magnetic elements 225 and the second magnetic elements 226. Outside the interval of interaction positions ΔZ, the magnetic force decays rapidly as a result of the increasing distance. In this way, passage of the movable mass 216 through the interval of interaction positions ΔZ, transmits, through contactless interactions between the first magnetic elements 225 and the second magnetic elements 226, a force pulse that sets the piezoelectric cantilever elements 217 in vibration.

The embodiment described enables efficient exploitation of the kinetic energy associated to the movable mass 216 for conversion into electrical energy, in particular thanks to the high density of piezoelectric cantilever elements 217 that it is possible to obtain thanks to modern techniques of machining of semiconductors.

Figure 11:
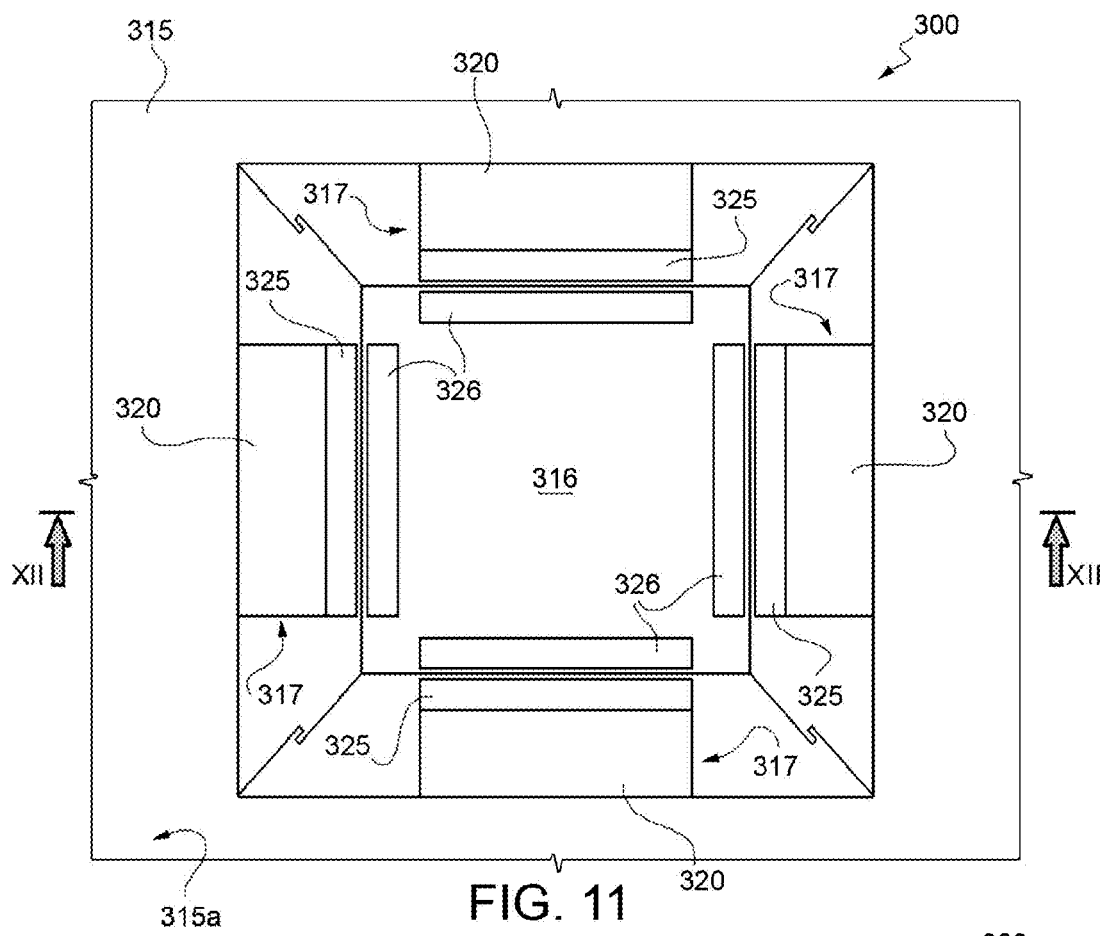
FIG. 11 is a top plan view, with parts removed for clarity, of a piezoelectric transducer according to a further embodiment of the present disclosure.
Figure 12:
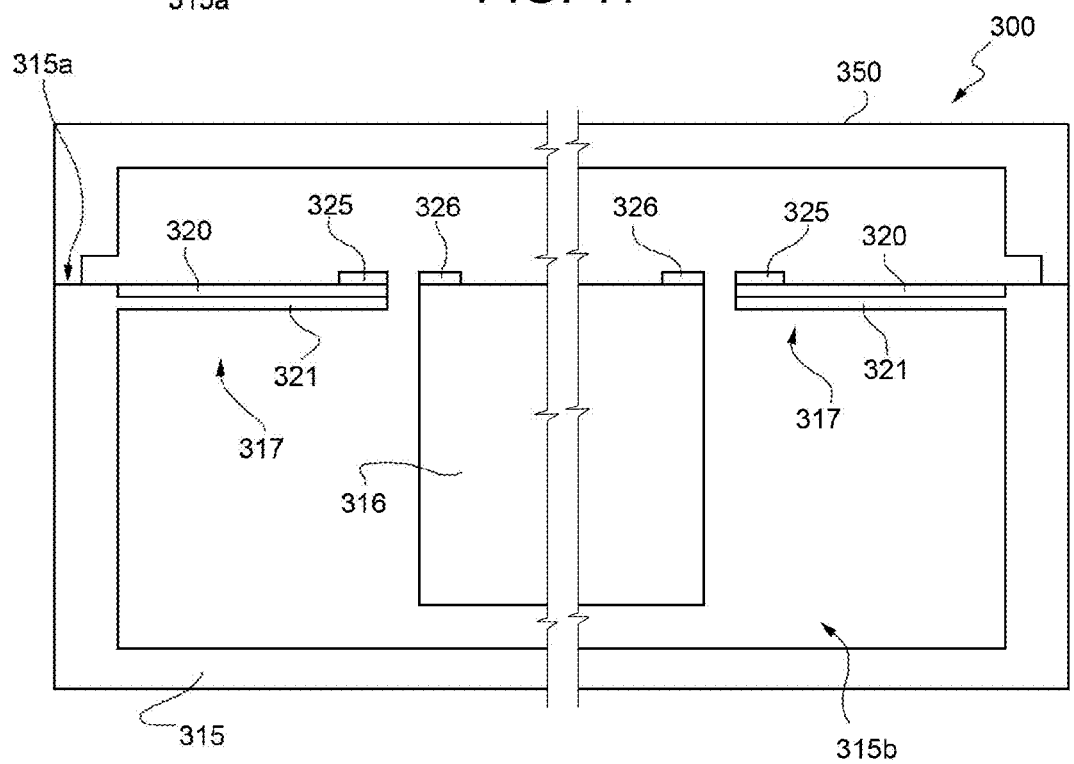
FIG. 12 is an enlarged cross-sectional view through the piezoelectric transducer of FIG. 11, taken along the line XII-XII of FIG. 12.

FIGS. 11 and 12 illustrate a piezoelectric transducer 300 according to a different embodiment of the present disclosure. The transducer 300 comprises a supporting body 315, a movable mass 316, and a plurality of oscillating piezoelectric cantilever elements 317. The supporting body 315, the movable mass 316, and parts of the piezoelectric cantilever elements 317 are made of semiconductor material, for example monocrystalline silicon. Also illustrated in FIG. 12 is a protective cap 350 arranged to cover the movable mass 316.

The supporting body 315 has a recess 315b accessible through a face 315a. The recess 315b houses the movable mass 316, which, in a rest configuration, is flush with the face 315a.

The movable mass 316 has a substantially rectangular or square shape and is elastically connected to the supporting body 315 by a system of suspensions 318, configured to enable oscillations of the movable mass 316 along a transduction axis Z' at a first resonance frequency. In the example described, in particular, the transduction axis Z' is perpendicular to a face 315a of the supporting body 315. The transducer 300 is consequently of the so-called "out of plane" type.

Present for each side of the movable mass 316 is a respective piezoelectric cantilever element 317, which extends, in one direction, from the supporting body 315 as far as into the proximity of the movable mass 316 and, in the perpendicular direction, substantially along the entire respective side of the movable mass 316. The piezoelectric cantilever elements 317 are defined by piezoelectric layers 320 formed on faces of respective flexible supporting plates 321 made of semiconductor material, integral with the supporting body 315 and having faces parallel to the face 315a of the supporting body 315 itself.

The piezoelectric layers 320 and the supporting plates 321 are shaped so that any bending of the supporting plates 321 causes corresponding deformations of the respective piezoelectric layers 320. Furthermore, the piezoelectric layers 320 are connected to respective contact pads 322 on the supporting body 315.

The ensemble of each piezoelectric cantilever element 317 and of the respective piezoelectric layer 320 is elastically deformable and can oscillate with respect to a rest position at a second resonance frequency, higher than the first resonance frequency. The oscillations are substantially in planes perpendicular to the face 315a of the supporting body 315.

First magnetic elements 325 and second magnetic elements 326 are set, respectively, at the free ends of the piezoelectric cantilever elements 317 and on the movable mass 316. In one embodiment, the first magnetic elements 325 and second magnetic elements 326 are continuous strips. The first magnetic elements 325 extend along the entire edge of the respective piezoelectric cantilever elements 317. The second magnetic elements 326 have a length substantially equal to the length of the respective coupled first magnetic elements 325.

The first magnetic elements 326 are set at the free ends of respective piezoelectric cantilever elements 317 and hence are in the proximity of corresponding second magnetic elements 326 at least when the movable mass 316 is within an interval of interaction positions ΔZ around a rest position $Z_0$ of the piezoelectric cantilever elements 317.

The magnetic characteristics of the first magnetic elements 325 and of the second magnetic elements 326 are selected so that a magnetic force deriving from the interaction of the first magnetic elements 325 and of the second magnetic elements 326 is sufficient to deform the piezoelectric cantilever elements 317 upon passage of the movable mass 316 through the interval of interaction positions ΔZ. Outside the interval of interaction positions ΔZ, instead, the elastic return force due to the deformation of the piezoelectric cantilever element 317 prevails over the magnetic force between the first magnetic elements 325 and the second magnetic elements 326.

Consequently, passage of the movable mass 316 through the interval of interaction positions ΔZ, transmits, through contactless interactions between the first magnetic elements 325 and the second magnetic elements 326, a force pulse that sets the piezoelectric cantilever elements 317 in vibration.

The embodiment described enables limitation of the number of connections for harvesting of the mechanical energy and its conversion into electrical energy. Furthermore, the area of piezoelectric material available is further increased, given the same efficiency, and manufacture is simplified.

Figure 13:
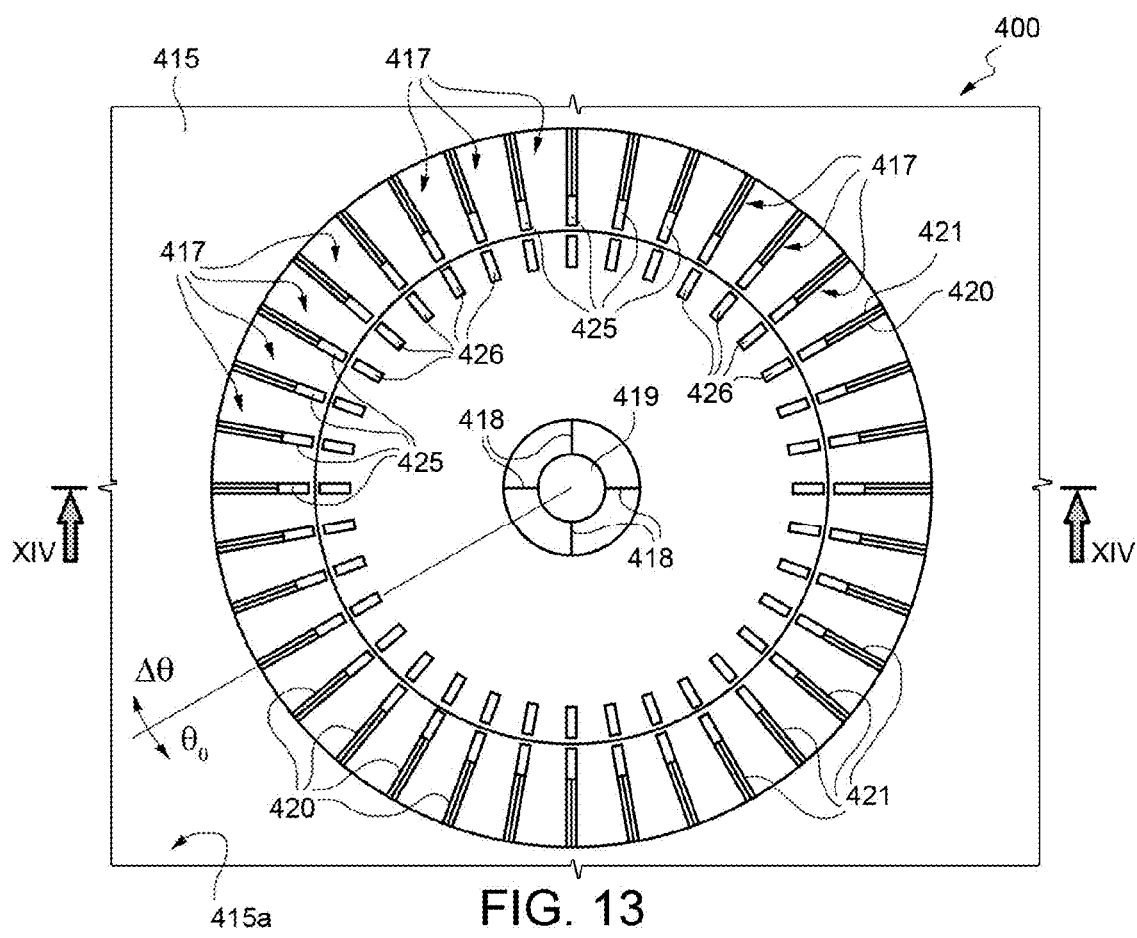
FIG. 13 is a top plan view, with parts removed for clarity, of a piezoelectric transducer according to a further embodiment of the present disclosure.
Figure 14:
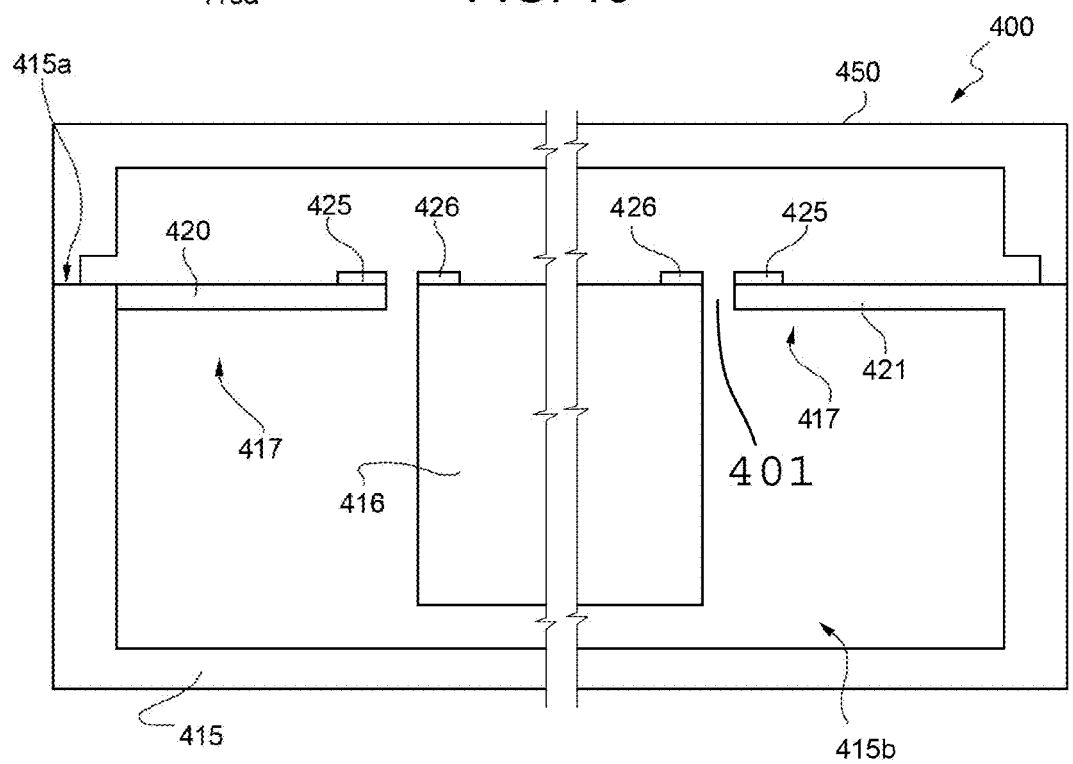
FIG. 14 is an enlarged cross-sectional view through the piezoelectric transducer of FIG. 13, taken along the line XIV-XIV of FIG. 13.

Illustrated in FIGS. 13 and 14 is a piezoelectric transducer 400 according to a further embodiment of the present disclosure.

The piezoelectric transducer 400 comprises a supporting body 415, a movable mass 416, and a plurality of oscillating piezoelectric cantilever elements 417. The supporting body 415, the movable mass 416, and part of the piezoelectric cantilever elements 417 are made of semiconductor material, for example monocrystalline silicon. Also illustrated in FIG. 14 is a protective cap 450 arranged to cover the movable mass 416.

The supporting body 415 has a face 415a in which a circular recess 415b is provided. The recess 415b houses the movable mass 416, flush with the face 415a.

Also the movable mass 416 has a circular shape and is connected to the supporting body by a system of suspensions 418 connected to a central anchorage 419. The suspensions 418 are configured so as to enable the movable mass 416 to perform oscillating rotational movements, at a first resonance frequency, about a transduction axis Z" perpendicular to the movable mass 416 itself (in practice, perpendicular to the face 415a of the supporting body 415).

The piezoelectric cantilever elements 417 are defined by piezoelectric layers 420 formed on faces of respective supporting plates 421 made of semiconductor material, integral with the supporting body 415 and having faces perpendicular to the face 415a of the supporting body 415 itself. The piezoelectric layers 420 and the supporting plates 421 are shaped so that any bending of the supporting plates 421 causes corresponding deformations of the respective piezoelectric layers 420. Furthermore, the piezoelectric layers 420 are connected to respective contact pads 422 set on the supporting body 415.

The piezoelectric cantilever elements 417 project from the perimeter of the recess 415b in a radial direction inwards and extend as far as into the proximity of the movable mass 416, from which they are separated by radial gaps 401. The piezoelectric cantilever elements 417 are hence not in direct contact with the movable mass 416, either in a rest condition or in normal conditions of motion of the movable mass 416 itself The ensemble of each piezoelectric cantilever element 417 and of the respective piezoelectric layer 420 is elastically deformable and can oscillate with respect to a rest position at a second resonance frequency, higher than the first resonance frequency. The plane of oscillation of the piezoelectric cantilever elements 417 is substantially parallel to the face 415a of the supporting body 415.

First magnetic elements 425 and second magnetic elements 426 are set, respectively, at the free ends of the piezoelectric cantilever elements 417 and on the movable mass 416.

The second magnetic elements 426, in particular, are arranged along the perimeter of the movable mass 416 and are each aligned to a respective piezoelectric cantilever element 417, when the movable mass 416 is in a rest angular position.

The first magnetic elements 425 are set at the free ends of respective piezoelectric cantilever elements 417 and hence are in the proximity of corresponding second magnetic elements 426 at least when the movable mass 416 is in an interval of interaction angular positions $\Delta\theta$ around a rest position $\theta_0$. In one embodiment, in the rest position $\theta_0$ of the movable mass 416, the second magnets 426 are aligned to respective piezoelectric cantilever elements 417, which are in turn in rest conditions. The direction of movement of the second magnetic elements 426 is moreover perpendicular to the faces of the piezoelectric cantilever elements 417 (the path of the first magnetic elements 425 is in fact circular, whereas the piezoelectric cantilever elements 417 extend in a radial direction).

The magnetic characteristics of the first magnetic elements 425 and of the second magnetic elements 426 are selected so that a magnetic force deriving from the interaction of the first magnetic elements 425 and of the second magnetic elements 426 is sufficient to deform the piezoelectric cantilever elements 417 during rotation of the movable mass 416 through the interval of interaction angular positions $\Delta\theta$. Furthermore, the magnetic characteristics of the first magnetic elements 425 and of the second magnetic elements 426 are selected so that, outside of the interval of interaction angular positions $\Delta\theta$ the elastic return force due to deformation of the piezoelectric cantilever element 417 prevails over the magnetic force between the first magnetic elements 425 and the second magnetic elements 426. Outside of the interval of interaction angular positions $\Delta\theta$ the magnetic force decays rapidly as a result of the increasing distance. In this way, rotation of the movable mass 416 through the interval of interaction angular positions $\Delta\theta$ transmits, through contactless interactions between the first magnetic elements 425 and the second magnetic elements 426, a force pulse that sets the piezoelectric cantilever elements 417 in vibration.

Finally, it is evident that modifications and variations may be made to the system and method described herein, without thereby departing from the scope of the present disclosure.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a piezoelectric transducer configured to harvest environmental energy and to convert harvested environmental energy into a harvesting electrical signal, the piezoelectric transducer including:
      a semiconductor substrate;
      a cantilever component having a piezoelectric element;
      a first magnetic element on the cantilever component; and
      a second magnetic element configured to interact with the first magnetic element to move the cantilever component;
   a storage element configured to store electrical energy from the piezoelectric transducer; and
   a harvesting interface coupled to the piezoelectric transducer and configured to provide a charge electrical signal to the storage element as a function of the harvesting electrical signal.

2. The system of claim 1, further comprising:
   a movable mass elastically coupled to the substrate, the second magnetic element being on the movable mass and the cantilever component extending from a portion of the substrate.

3. The system of claim 1, further comprising a driving element configured to receive the harvesting electrical signal and to control a switch.

4. The system of claim 3 wherein the driving element is configured to selectively connect and disconnect the harvesting interface to the storage element based on the piezoelectric transducer.

5. The system of claim 4 wherein the driving element is configured to connect the harvesting interface to the storage element when the harvesting electrical signal exceeds an activation threshold to charge the storage element.

6. A device, comprising:
   a substrate including a recess having a base and a sidewall, the base extending in a first direction, the sidewall extending in a second direction that is transverse to the first direction;
   a moveable mass coupled to the base, the movable mass configured move in the first direction;
   a plurality of cantilever piezoelectric elements extending from the sidewall towards the moveable mass;
   a plurality of first magnetic elements on the plurality of cantilever piezoelectric elements, respectively; and
   a plurality of second magnetic elements on the moveable mass.

7. The device of claim 6 wherein the plurality second magnetic elements are configured to respectively interact with the plurality of first magnetic elements, and respectively generate respective force pulses on the plurality of cantilever piezoelectric elements, respectively.

8. The device of claim 6 wherein the plurality of cantilever piezoelectric elements extend towards the movable mass without directly contacting the movable mass.

9. The device of claim 6 wherein the movable mass has a circular shape, and the plurality of cantilever piezoelectric elements extends in a radial direction.

10. The device of claim 6 wherein the movable mass configured to rotate in the first direction.

11. The device of claim 6, further comprising:
    an anchorage coupled to the base; and
    a suspension coupling the movable mass to the anchorage.

12. The device of claim 6, further comprising:
    a cap on the substrate and overlying the moveable mass.

13. A device, comprising:
    a substrate including a surface;
    a moveable mass coupled to the surface of the substrate, the moveable mass configured to move in a first direction;
    a cantilever piezoelectric element coupled to the moveable mass, the cantilever piezoelectric element extending in a second direction that is transverse to the first direction; and
    a first magnetic element on the cantilever piezoelectric element; and
    a second magnetic element on the surface of the substrate, the first magnetic element being positioned on the cantilever piezoelectric element such that the first magnetic element overlies the second magnetic element when the moveable mass moves in the first direction.

14. The device of claim 13, further comprising:
an anchorage coupled to the surface of the substrate; and
a suspension coupling the movable mass to the anchorage.

15. The device of claim 14, further comprising:
a contact pad on the surface of the substrate, the contact pad being electrically coupled to the cantilever piezoelectric element via the anchorage and the suspension.

16. The device of claim 13 wherein the cantilever piezoelectric element includes a supporting plate and a piezoelectric layer, and the piezoelectric layer is between the supporting plate and the first magnetic element.

17. The device of claim 16 wherein the piezoelectric layer is spaced from the supporting plate by the first magnetic element in the first direction.

* * * * *